June 9, 1959  E. D. HINDENBURG  2,889,728
WIRE STRIPPER

Filed March 30, 1956  3 Sheets-Sheet 1

Inventor
Eugene D. Hindenburg
by Parker & Carter
Attorneys

June 9, 1959 E. D. HINDENBURG 2,889,728
WIRE STRIPPER

Filed March 30, 1956 3 Sheets-Sheet 2

Inventor
Eugene D. Hindenburg
by Parker & Carter
Attorneys

June 9, 1959 — E. D. HINDENBURG — 2,889,728
WIRE STRIPPER
Filed March 30, 1956 — 3 Sheets-Sheet 3
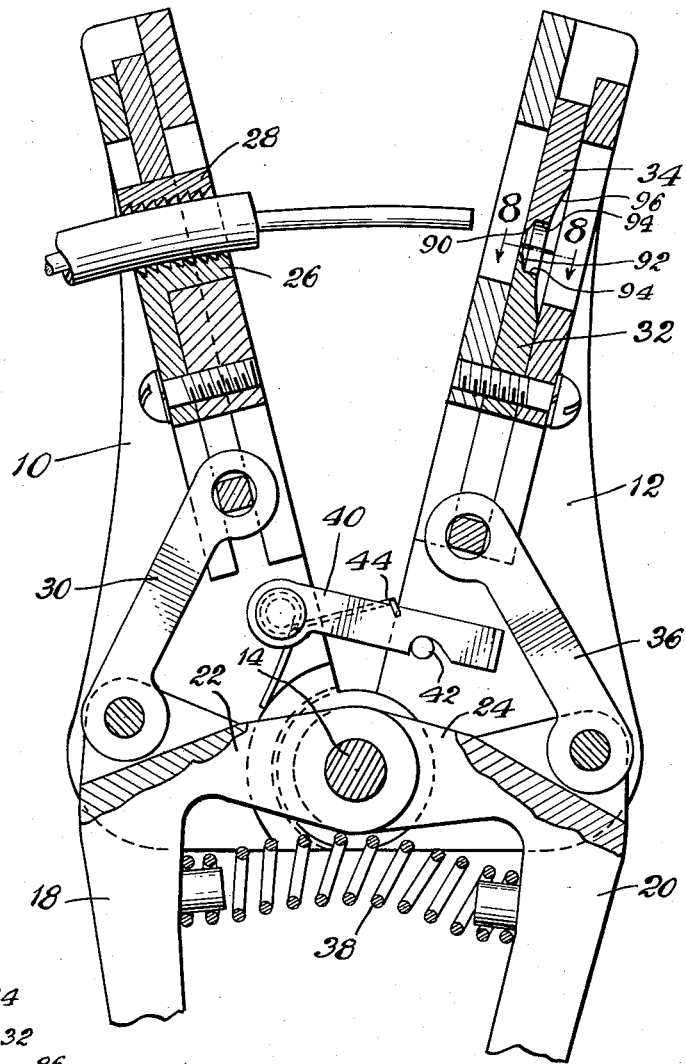
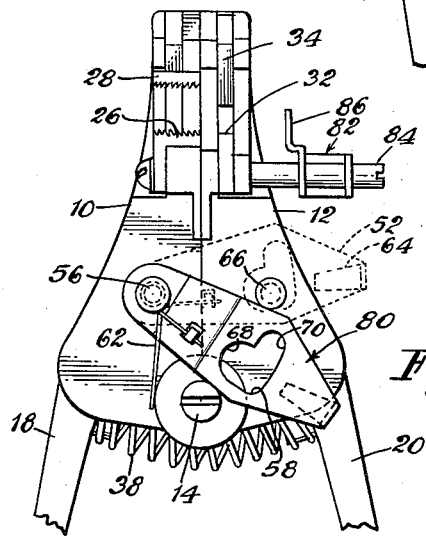
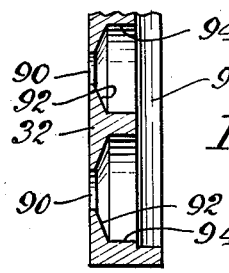
Inventor
Eugene D. Hindenburg
by Parker & Carter
Attorneys

United States Patent Office 2,889,728
Patented June 9, 1959

2,889,728

WIRE STRIPPER

Eugene D. Hindenburg, De Kalb, Ill., assignor to Ideal Industries, Inc., Sycamore, Ill., a corporation of Delaware Application March 30, 1956, Serial No. 575,031

6 Claims. (Cl. 81—9.5)

My invention is a wire stripping device constructed and adapted to strip the insulation from the end of an insulated wire, so that the wire can be joined in a connection of any suitable type.

A primary object of my invention is a wire stripper of the type generally shown in U.S. Patent No. 2,523,936, and having an auxiliary latch mechanism which prevents the stripping mechanism from executing a full stroke and at the same time provides a dwell period in the return movement of the levers to prevent the stripped ends of the wires from being frayed or damaged.

In certain industries the stripped end of the wire, after the insulation is removed, is referred to as a shiner, and the sleeve of stripped insulation is referred to as a slug. Hereafter in the ensuing specification, for simplicity, I may use these terms.

Another object of my invention is a wire stripper constructed to separate a slug from the insulation on the wire but to execute only a partial stroke so that the slug is only partially removed from the end of the shiner or stripped end.

Another object is a stripper specifically constructed to strip insulated wire which has a coating that is tough in tension but slippery, such as Fiberglas or a tetrafluoroethylene polymer, may or may not be transparent, is waxy in appearance but soft under compression and is easy to nick but hard to cut. I mention for example a coating that goes by the name Teflon, and when I use that term hereinafter I intend to include all coatings which have the above general characteristics.

Another object is an auxiliary latch mechanism on a stripper of the above type which limits the maximum pivotal excursion of the clamping and stripping jaws during a stripping operation.

Another object is a wire stripper of the above type with a wire stop to regulate the length of the slug.

Another object is an auxiliary latch mechanism on a stripper of the above type which is constructed to be released in response to the return movement of the handles and blades or jaws.

Another object of my invention is a stripper mechanism with two latching devices, one being a main latch and the other being an auxiliary latch, with the auxiliary latch being positionable in either an operative or an inoperative position.

Another object is a stripper mechanism of the above type with two latch devices, the main latch being operative when the auxiliary latch is in its inoperative position, and vice versa.

Another object is an auxiliary latch mechanism which can be mounted on a standard stripper, for example, the type shown in U.S. Patent No. 2,523,936, to adapt it for use in stripping Teflon coated wire and the like.

Another object of my invention is a wire stop for use on a standard stripper, for example, the type shown in U.S. Patent No. 2,523,936, for determining the length of the slug stripped from the end of a wire.

Another object is an auxiliary latch on a stripper of the above type which is adapted to be moved to an inoperative position so that there is no limit to the opening movement of the jaws.

Other objects will appear from time to time in the ensuing specification and drawings in which:

Figure 6 is a view similar to Figure 3, showing the operative and inoperative positions of the auxiliary latch mechanism;

Figure 7 is a view similar to Figure 4 showing my stripper with the main latch mechanism operative; and Figure 8 is a section taken along line 8—8 of Figure 7.

To begin with this invention is in the nature of an improvement on the wire stripper shown and claimed in U.S. Patent No. 2,523,936, although it is not restricted to that specific wire stripper, but reference is made to that patent for the details of the basic structure.

Figure 1:
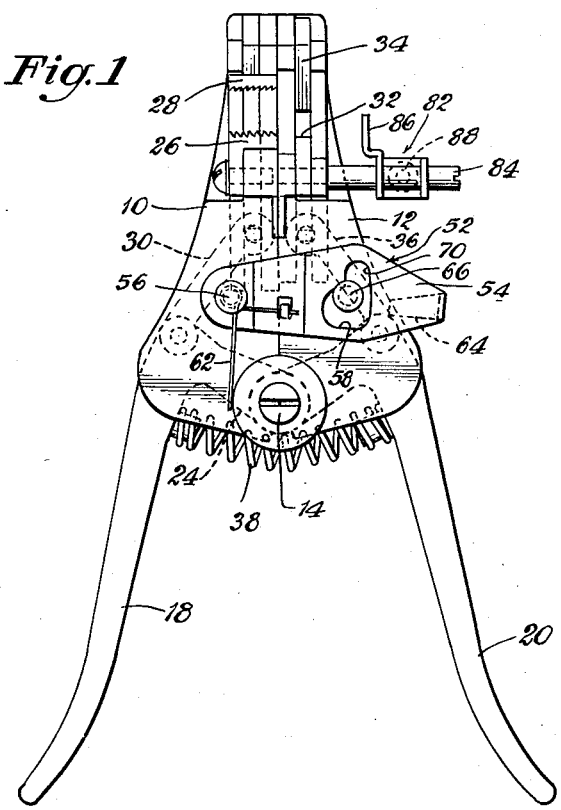
Figure 1 is the plan view of my wire stripper, when not in use.
Figure 2:
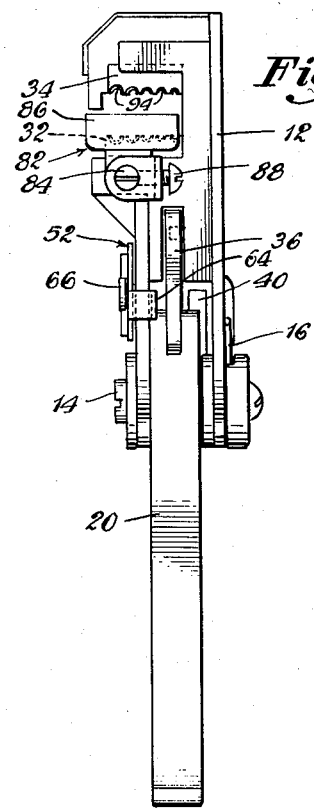
Figure 2 is a side view of Figure 1.

Basically the stripper includes a pair of levers 10 and 12 pivoted together at 14. A coil spring 16 is positioned on the back of the levers to bias them to the closed position shown on Figure 1.

Figure 4:
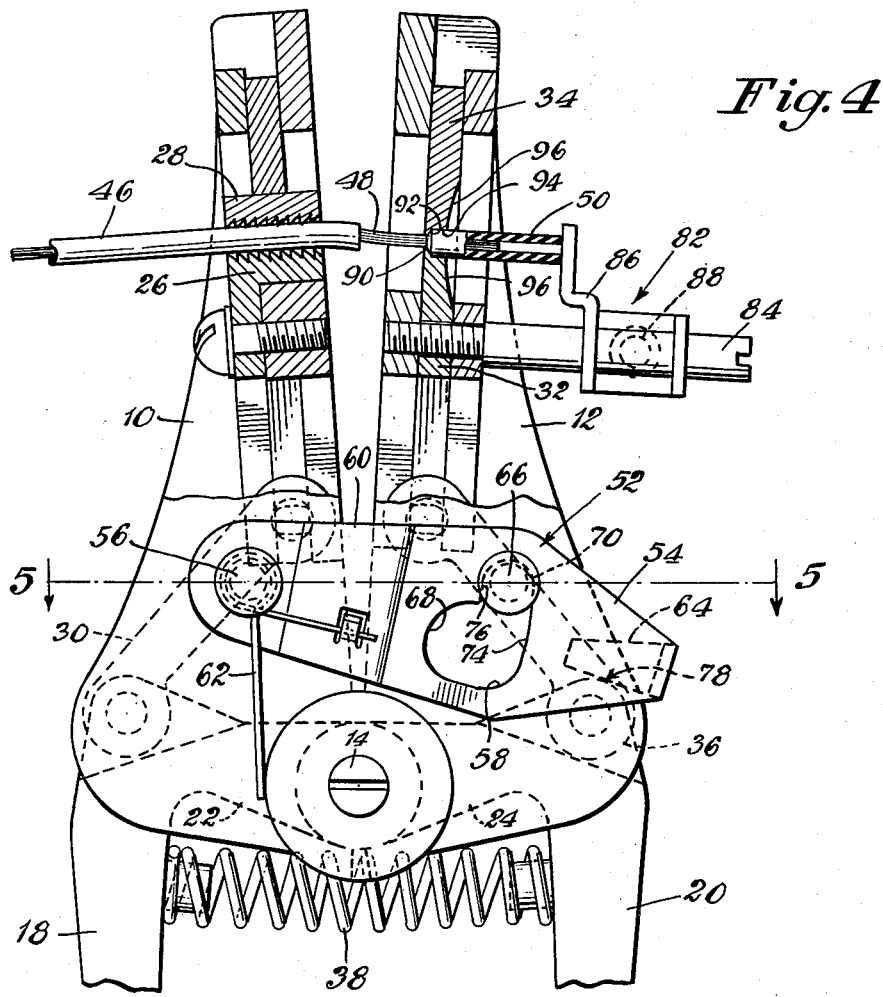
Figure 4 is a view similar to Figure 3, partly in section, on an enlarged scale, illustrating my wire stripper in use after the slug has been partially stripped from the shiner.

A pair of handles 18 and 20 with inward lugs 22 and 24 are also pivoted at 14 for manual manipulation. One lever carries clamping jaws for holding the insulated wire while the other lever carries stripping jaws or knives to cut through the insulation and strip it off when the levers are biased apart. One gripping jaw 26 is fixed on its lever while the other 28 is movable and slides to and from the fixed jaw by actuation of the handle members to which it is connected by a link 30. The gripping jaws have specially constructed serrated faces so that the tough but fragile coating will be gripped without nicking or cutting. As shown in Figure 4 the serrations are formed as closely spaced grooves, each with one vertical wall and one inclined wall so that the grooves open rearwardly or away from the direction of applied tension during a stripping operation. These serrations extend the full lateral width of the faces, and the overall contact between the jaws and the coated wire is such that the applied pressure will be uniformly distributed on the engaged portion of the coating. The fixed stripping jaw or knife 32 opposes the movable stripping jaw 34 which is tied to the handles by a link 36. A coil spring 38 is disposed between the handles to bias the gripping and stripping jaws open.

A latch mechanism, which I shall call the first or normal latch mechanism 40, is disposed between the levers and is pivotly mounted on one of them to coact with a pin 42 on the other. A spring 44 biases the latch so that when the levers are separated, the notch will engage the pin and will temporarily hold the levers apart while the handles are being released by the operator. The latch is knocked off by return movement of the handles as shown in Patent No. 2,523,936.

All of the above is basically the same as that shown in this prior U.S. patent, and further details will not be set forth.

In certain industries where wire strippers are used, the wire to be stripped may be coated with a plastic cover, known as Teflon. This coating is very difficult to strip and special jaws for gripping and stripping the wire must be made. Additionally the Teflon, when separated from the insulation, called a slug, should not be entirely removed from the end of the wire because the stripped wire will not be immediately used. The wire is stranded, and if the shiner or stripped end is completely exposed for a period of time, it may fray and when the user eventually wants to make a connection, the frayed end will be more difficult to handle and will result in a less efficient connection.

In Figure 4 I have shown what may be a Teflon wire 46 which has been partially stripped. The stripped end exposes a stranded wire or shiner 48 and the separated coating or slug 50 stays on the stranding and can be slid off of the wire in one piece later. In the position shown in this figure a substantial portion of the end of the shiner remains in the slug and is protected. The stripping operation should stop at this point and the wires should be removed with the slug in the position shown.

The wire stripper, in its normal form, is inoperative to perform the above described function, because when the handles are compressed together by the operator, the levers will spread too far. When the end of the shiner passes through the stripping jaws the slug will normally be discarded.

To prevent this and to properly operate the stripper so that the slug will stay in a partially stripped position, I provide what I term a second or auxiliary latch mechanism or assembly 52 which includes a latch plate 54 pivoted to one of the levers by pivot pin 56 and having a cam opening 58 with a particular contour to be described herein below. The plate is bent at 60 to form a channel for the raised edges on the levers. A coil spring 62 around the pivot pin biases the latch plate clockwise in Figure 4. The tab end 64 of the latch plate is bent back 180 degrees and spaced slightly from the plate so it can fit around the front face of the lever 12 for reasons set forth herein below. A latch pin 66 with an enlarged head is mounted on the front face of the lever 12 and passes through the cam opening or slot 58.

Figure 3:
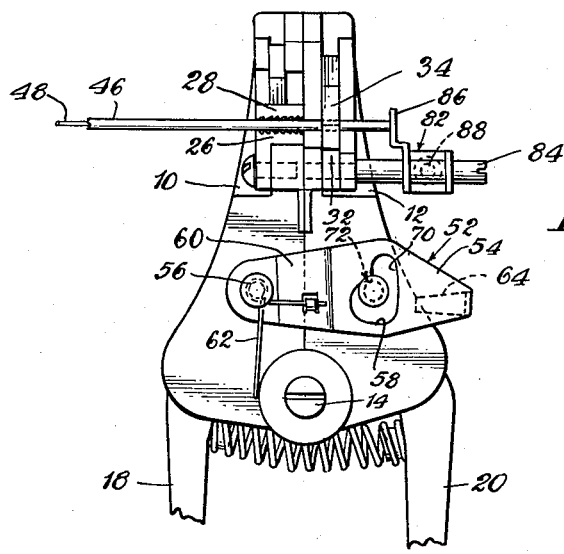
Figure 3 is a plan view in the position of use after the insulation has been cut or severed but before stripping.

The cam opening 58 includes a main elliptical portion 68 and an upper notch 70 which is adapted to fit around the shank of the latch pin but is smaller than the head of the latch pin as shown in Figure 4. When the levers are closed, as in Figure 3 the latch pin and the pivot of the latch plate are spaced, relative to the dimensions of the plate such that the upper edge of the elliptical opening 68 engages the top of the latch pin as at 72 in Figure 3. As the spring 62 tends to bias the latch plate clockwise, when the levers are slightly separated due to manual closing of the handles, the shank of the latch pin will be accepted by the upper notch 70 of the cam slot and the latch plate pivots to position of Figure 4. The shank of the latch pin engages the right edge of the cam groove and prevents further separation of the levers, and this determines the position of the slug in its partially stripped position on the shiner. The operator then releases the handles, and the initial return movement of the levers is blocked because the left edge 76 of the upper notch 70 in the latch plate engages the shank of the latch pin. This momentarily holds the levers in a fixed position but the handles continue to spread until the upper edge of the handle 20 engages the tab 64 of the latch plate at 78 during its return movement. This raises the latch plate and knocks it off of the latch pin allowing the levers to return to the closed position of Figure 1. In the meantime, during the return movement of the handles before the latch plate is raised by return movement of the handles, the gripping and stripping jaws will open sufficiently to allow the partially stripped wire to be removed.

Figure 5:
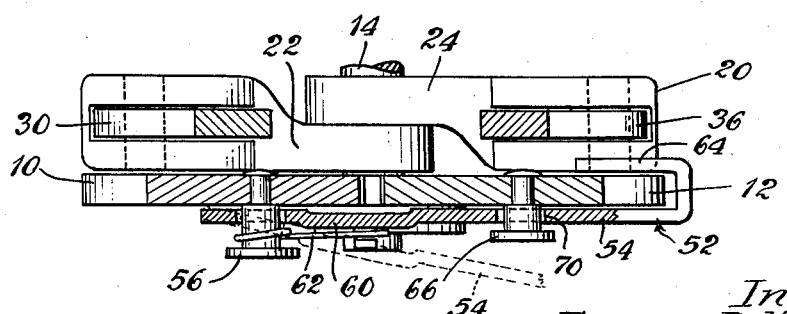
Figure 5 is a sectional view taken along line 5—5 of Figure 4.

As shown in Figure 5, there is play in the latch plate around the pivot pin. The coil spring can be compressed by raising the other end of the latch plate slightly. The head of the latch pin 66 will pass through the lower part 68 of the cam notch and the latch plate can be raised and pivoted downwardly to the inoperative position shown at 80 in Figure 6. The operator can then use the stripper with its normal latch mechanism 40 in Figure 7 when he is stripping other insulating wire, or he can pivot the latch plate 54 to its operative position and effectively strip Teflon wire or the like.

When the auxiliary latch is in its inoperative position, of Figure 6, the jaws may be separated to almost any desired extent.

I also provide a wire stop assembly 82 which includes a post 84 threaded into the lever 12 with a stop 86 which can be fixed in any desired position by the set screw 88. With this wire stop in a selected position, the wire can be positioned between the jaws with its end engaging the plate.

The setting of the wire stop should be related to the maximum pivotal excursion of the levers allowed by the latch plate so that the slug will not be pulled off the shiner.

Additional, the auxiliary latch could be adjustable so that the length of the slug could be controlled for micrometer adjustments. For example the latch pin could have an eccentric mounting.

Teflon coated wire or the like is very difficult to cut and strip, and I show a section of the jaws for cutting and stripping the wires in Figure 8. The jaws are symmetric and I have only shown one. Severing is performed by a cylindrical section 90 which has approximately the same diameter as the stranded wire proper. The next section is conical at 92 to perform a cutting action. The next section 94 is cylindrical and may have approximately the same diameter or possibly slightly larger than the outside of the coating. The back of the blades may be relieved at 96.

The use, operation and function of my invention are as follows:

I provide, in a sense, an attachment for a standard stripper, and in a sense a new over-all stripper. The normal stripper has a basic or first latch mechanism which prevents the levers from closing and provides a dwell period while the jaws are opening so that the stripped wire can be removed. This prevents the stranded ends of the wire from being crushed and frayed by the closing levers.

I provide a second or auxiliary latch mechanism which is used to partially strip an insulation coated wire, for example Teflon coated wire or the like. This auxiliary latch mechanism is constructed and arranged to provide a shorter stroke of the levers. I also provide a wire stop which can be adjusted to give a longer length of slug than the pivoted stroke of the levers. Thus at the end of the stripping operation the slug will not be completely removed from the shiner, and the partially stripped wire can be set aside until the operator wants to make a connection. The end of the stranded wire will be covered by the slug in the meantime.

The auxiliary latch mechanism also provides a dwell period for allowing the jaws to separate while the levers are held stationary so the wire, partially stripped, can be removed, affording protection.

The auxiliary latch can be positioned in either an operative or inoperative position, and while it is in an operative position it renders the main or first latch mechanism ineffective or inoperative. If the operator wants to use the wire stripper in the normal manner, he merely pivots the auxiliary latch mechanism to its inoperative position making the first or main latch mechanism operative, and the stripper will function normally.

Another important point is the specific structure of the stripping jaws or knives. These are shown in detail in Figure 8. The large cylindrical portion 94 has a diameter only slightly greater than the diameter of the coating. This section is concentric with the cutting hole 90. The cylindrical portion 94 serves as a pilot or centering means for the wire so that the metal of the wire will not be nicked by the smaller cutting hole 90. The tapered or conical portion 92 affects a shearing or cutting so that a combination cutting and shearing or tearing action takes place.

While I shall show and describe one form of my invention it should be understood that the basic concept can be applied to other strippers. I disclosed my invention applied to or in the form of the stripper shown in U.S. Patent No. 2,523,936, but it should be understood that the same basic approach can be taken on different types of strippers, for example the one shown in my copending application, Serial No. 488,294, filed February 15, 1955, now Patent No. 2,842,992, issued July 15, 1958. With this and other modifications in mind I therefore wish that my invention be unrestricted except as by the appended claims.

I claim:

1. In a stripper mechanism, a pair of pivoted levers, handles pivoted on the levers, pairs of clamping and stripping jaws on the levers and handles operated by manipulation of the levers to grasp and strip insulation from wire positioned between the jaws, a first latch mechanism on the levers constructed to hold the levers temporarily apart in a first pivoted position when the levers have been pivoted to that position by manipulation of the handles, means for releasing the first latch mechanism in response to return movement of the handles, a second latch mechanism on the levers constructed to hold the levers temporarily apart in a second pivoted position less extreme than the first, said second latch mechanism including means preventing pivotal movement of the levers to the first pivoted position thereby rendering the first latch mechanism inoperative but allowing movement of the levers to the second pivoted position, and means for selectively rendering the second latch mechanism operative or inoperative and therefore the first latch mechanism inoperative or operative.

2. The structure of claim 1 further characterized by and including a wire stop on one of the levers positioned at a distance relative to the jaws such that the length of stripped insulation will be greater than the pivotal distance of the levers as determined by the second latch mechanism.

3. In a stripper mechanism, a pair of pivoted levers, handles pivoted on the levers, pairs of clamping and stripping jaws for the levers and handles operated by manipulation of the levers to grasp and strip insulation from wire positioned between the jaws, a first latch mechanism on the levers constructed to hold the levers temporarily apart in a first pivoted position when the levers have been pivoted to that position by manipulation of the handles, means for releasing the first latch mechanism in response to return movement of the handles and jaws, a second latch mechanism on the levers constructed to hold the levers temporarily apart in a second pivoted position less extreme than the first, said second latch mechanism including means preventing pivotal movement of the levers to the first pivoted position when the second latch mechanism is operative thereby rendering the first latch mechanism inoperative but allowing movement of the levers to the second pivoted position, and means for selectively rendering the second latch mechanism operative, and therefore the first latch mechanism inoperative, and for rendering the second latch mechanism inoperative, and therefore the first latch mechanism operative.

4. The structure of claim 3 further characterized by and including a wire stop on one of the levers positioned at a distance relative to the jaws such that the length of stripped insulation will be greater than the pivotal distance of the levers as determined by the second latch mechanism.

5. In a stripper mechanism, a pair of pivoted levers, handles pivoted on the levers, pairs of clamping and stripping jaws on the levers and handles operated by manipulation of the levers to grasp and strip insulation from wire positioned between the jaws, a first latch mechanism on the levers constructed to hold the levers temporarily apart in a first pivoted position when the levers have been pivoted to that position by manipulation of the handles, means for releasing the first latch mechanism in response to return movement of the handles, a second latch mechanism on the levers constructed to hold the levers temporarily apart in a second pivoted position less extreme than the first, means for selectively rendering the second latch mechanism operative or inoperative, and means for preventing pivotal movement of the levers to the first pivoted position when the second latch mechanism is operative thereby rendering the first latch mechanism inoperative.

6. In a stripper mechanism, a pair of pivoted levers, handles pivoted on the levers, pairs of clamping and stripping jaws on the levers and handles operated by manipulation of the levers to grasp and strip insulation from wire positioned between the jaws, a first latch mechanism on the levers constructed to hold the levers temporarily apart in a first pivoted position when the levers have been pivoted to that position by manipulation of the handles, means for releasing the first latch mechanism in response to return movement of the handles, a second latch mechanism on the levers constructed to hold the levers temporarily apart in a second pivoted position less extreme than the first, means for selectively rendering the first and second latch mechanisms alternately operative and inoperative so that when the second latch mechanism is operative, the first latch mechanism will be inoperative, and vice versa.

References Cited in the file of this patent

UNITED STATES PATENTS

| | | |
|---|---|---|
| 2,179,581 | Voogd | Nov. 14, 1939 |
| 2,523,936 | Axelsen | Sept. 26, 1950 |
| 2,659,254 | Wood | Nov. 17, 1953 |
| 2,755,691 | Valiulis | July 24, 1956 |